United States Patent
Sippel et al.

(10) Patent No.: US 11,008,888 B2
(45) Date of Patent: May 18, 2021

(54) TURBINE VANE ASSEMBLY WITH CERAMIC MATRIX COMPOSITE COMPONENTS

(71) Applicants: Rolls-Royce Corporation, Indianapolis, IN (US); Rolls-Royce North American Technologies Inc., Indianapolis, IN (US)

(72) Inventors: Aaron D. Sippel, Zionsville, IN (US); Ted J. Freeman, Danville, IN (US); David J. Thomas, Brownsburg, IN (US); Adam L. Chamberlain, Mooresville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 566 days.

(21) Appl. No.: 16/037,715

(22) Filed: Jul. 17, 2018

(65) Prior Publication Data
US 2020/0025025 A1    Jan. 23, 2020

(51) Int. Cl.
*F01D 9/04* (2006.01)
*F01D 25/12* (2006.01)

(52) U.S. Cl.
CPC .......... *F01D 25/12* (2013.01); *F01D 9/041* (2013.01); *F05D 2220/323* (2013.01); *F05D 2240/12* (2013.01); *F05D 2260/20* (2013.01); *F05D 2300/6033* (2013.01)

(58) Field of Classification Search
None
See application file for complete search history.

(56) References Cited

U.S. PATENT DOCUMENTS

| | | | |
|---|---|---|---|
| 5,332,360 A * | 7/1994 | Correia | F01D 9/042 29/889.21 |
| 5,630,700 A * | 5/1997 | Olsen | F01D 5/189 415/134 |
| 6,325,593 B1 | 12/2001 | Darkins, Jr. et al. | |
| 6,514,046 B1 | 2/2003 | Morrison et al. | |
| 6,558,114 B1 | 5/2003 | Tapley et al. | |
| 6,648,597 B1 * | 11/2003 | Widrig | C04B 37/001 415/200 |
| 7,452,189 B2 * | 11/2008 | Shi | F01D 5/147 415/200 |

(Continued)

FOREIGN PATENT DOCUMENTS

| | | |
|---|---|---|
| EP | 1852572 A2 | 11/2007 |
| EP | 3124747 A1 | 2/2017 |
| EP | 3323983 A1 | 5/2018 |

OTHER PUBLICATIONS

Extended European Search Report, European Application No. 19186669.8-1006, dated Dec. 5, 2019, 9 pages.

*Primary Examiner* — Woody A Lee, Jr.
(74) *Attorney, Agent, or Firm* — Barnes & Thornburg LLP (57) ABSTRACT

A turbine vane assembly adapted for use in a gas turbine engine includes a vane support and a vane heat shield comprising ceramic matrix composite materials to insulate the metallic materials of the vane support. The turbine vane assembly further includes an aero-load transfer rib located outside of a primary gas path and configured to carry loads applied to the vane heat shield to the vane support.

15 Claims, 4 Drawing Sheets

(56) References Cited

U.S. PATENT DOCUMENTS

| | | | |
|---|---|---|---|
| 7,686,571 B1 * | 3/2010 | Matheny | F01D 9/041 |
| | | | 415/200 |
| 7,762,766 B2 | 7/2010 | Shteyman et al. | |
| 7,824,152 B2 * | 11/2010 | Morrison | F01D 9/042 |
| | | | 415/135 |
| 7,934,900 B1 * | 5/2011 | Pask | F01D 5/284 |
| | | | 415/115 |
| 8,292,580 B2 | 10/2012 | Schiavo et al. | |
| 8,454,303 B2 | 6/2013 | Garcia-Crespo | |
| 8,905,711 B2 | 12/2014 | Suciu et al. | |
| 8,998,566 B2 * | 4/2015 | Justl | F01D 11/005 |
| | | | 415/116 |
| 9,097,141 B2 | 8/2015 | Paradis | |
| 9,546,557 B2 | 1/2017 | Grooms, III et al. | |
| 9,803,486 B2 * | 10/2017 | Freeman | B23P 15/04 |
| 9,915,159 B2 | 3/2018 | Huizenga et al. | |
| 10,174,627 B2 | 1/2019 | Chang et al. | |
| 10,400,616 B2 * | 9/2019 | Tuertscher | F01D 9/044 |
| 2014/0001285 A1 | 1/2014 | Grooms, III et al. | |
| 2014/0255174 A1 | 9/2014 | Duelm et al. | |
| 2016/0003072 A1 | 1/2016 | Chang et al. | |
| 2016/0123163 A1 * | 5/2016 | Freeman | F01D 9/042 |
| | | | 415/200 |
| 2016/0123164 A1 * | 5/2016 | Freeman | F01D 5/284 |
| | | | 415/200 |
| 2016/0169033 A1 | 6/2016 | Weaver et al. | |
| 2016/0177759 A1 | 6/2016 | Tuertscher et al. | |
| 2016/0177761 A1 | 6/2016 | Huizenga et al. | |
| 2016/0201488 A1 | 7/2016 | Carr et al. | |
| 2016/0265384 A1 | 9/2016 | Walston et al. | |
| 2016/0265389 A1 | 9/2016 | Jarmon | |
| 2017/0022833 A1 | 1/2017 | Heitman et al. | |
| 2017/0051619 A1 | 2/2017 | Tuertscher | |
| 2017/0101880 A1 * | 4/2017 | Thomas | F01D 9/042 |
| 2018/0045117 A1 | 2/2018 | Groves, II et al. | |
| 2018/0223680 A1 | 8/2018 | Hafner | |
| 2018/0328187 A1 | 11/2018 | Oke | |
| 2018/0340431 A1 | 11/2018 | Kerns et al. | |
| 2018/0370158 A1 | 12/2018 | Gallier et al. | |
| 2020/0072066 A1 * | 3/2020 | Thomas | F01D 25/243 |

* cited by examiner

TURBINE VANE ASSEMBLY WITH CERAMIC MATRIX COMPOSITE COMPONENTS

FIELD OF THE DISCLOSURE

The present disclosure relates generally to vane assemblies for gas turbine engines, and more specifically to vanes that comprise ceramic-containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine vane assembly for use in a gas turbine engine may include a vane support and a vane heat shield. The vane support provides structural support for the turbine vane assembly and comprises metallic materials, while the vane heat shield comprises ceramic matrix materials and insulates the vane support from high temperatures in a primary gas path defined through the vane assembly.

In some embodiments, the turbine vane assembly further includes an aero-load transfer rib located outside of the primary gas path. The aero-load transfer rib may extend from the vane support to the vane heat shield to carry loads applied to the vane heat shield to the vane support while maintaining a cooling air gap between the vane heat shield and the vane support. The cooling air gap may be maintained at all radial locations along the primary gas path.

In some embodiments, the vane support includes an outer mount panel, a spar extending radially-inwardly from the outer mount panel, and a primary cooling channel extending radially through the outer mount panel and into the spar. The primary cooling channel allows flow of cooling air through the spar.

In some embodiments, the vane heat shield includes an outer end wall, an inner end wall, and an airfoil extending between and interconnecting the outer end wall and the inner end wall. The outer end wall defines a radially outer boundary of the primary gas path and the inner end wall defines a radially inner boundary of the primary gas path. The outer end wall shields the outer mount panel of the vane support from the primary gas path.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
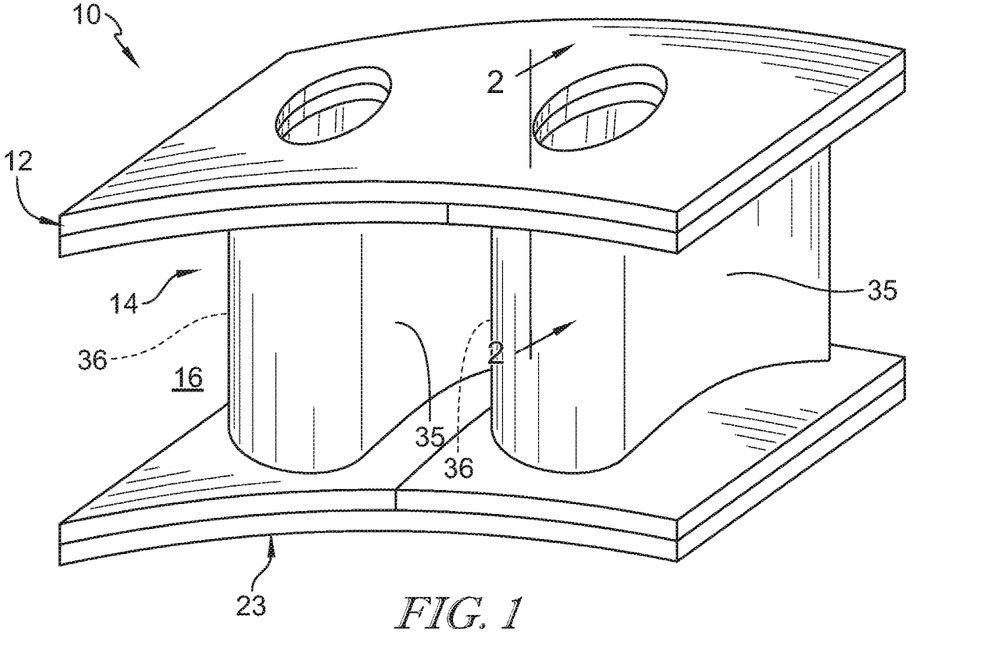
FIG. 1 is a perspective view of a turbine vane assembly in accordance with the present disclosure showing that the turbine vane assembly includes a vane support and a vane heat shield made of ceramic matrix composite materials that shield the vane support from hot gas that moves through a primary gas path of the turbine vane assembly.
Figure 2:
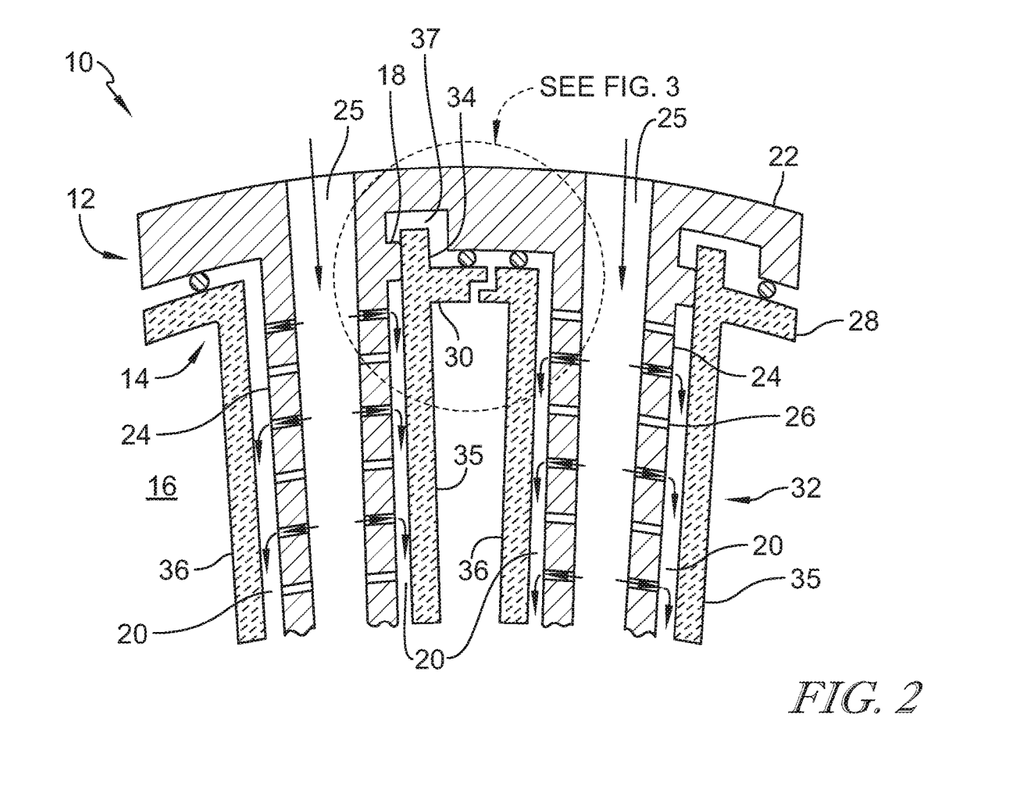
FIG. 2 is a cross-sectional view of a portion of the turbine vane assembly of FIG. 1 taken at line 2-2 showing that the turbine vane assembly includes an aero-load transfer rib radially spaced apart from the primary gas path that is configured to carry aerodynamic loads from the vane heat shield to the vane support so that a cooling gap is maintained between the vane heat shield and the vane support across the primary gas path.

An illustrative turbine vane assembly 10 extends partway about a central axis for use in a gas turbine engine is shown in FIG. 1. The turbine vane assembly 10 includes a vane support 12 and a vane heat shield 14. The vane support 12 provides structural support for the turbine vane assembly 10 and may be adapted for mounting in a ring or to a turbine case. The vane support 12 comprises metallic materials while the vane heat shield 14 comprises ceramic matrix composite materials as shown in FIG. 2. The vane heat shield 14 insulates the metallic materials of the vane support 12 from high temperatures in a primary gas path 16 defined through the turbine vane assembly 10.

Figure 3:
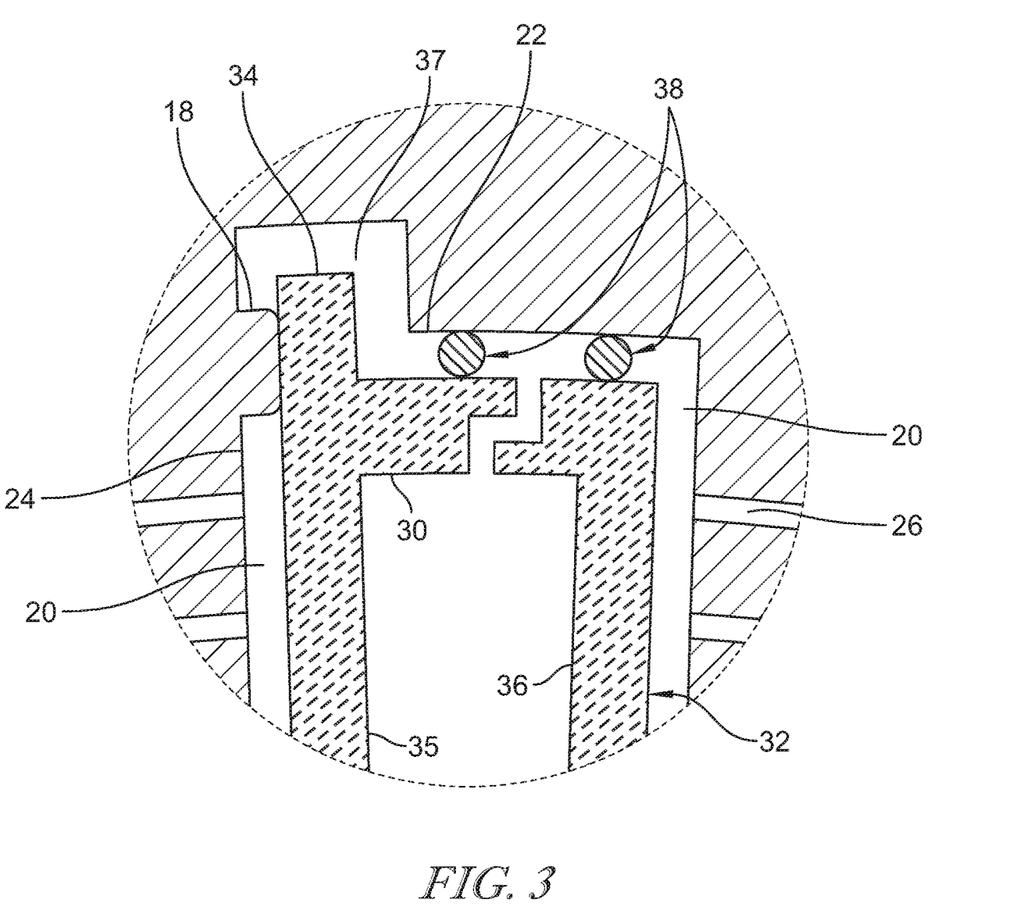
FIG. 3 is a detail view of the turbine vane assembly of FIG. 2 showing the aero-load transfer rib extends from the vane support to the vane heat shield and further showing a compressible seal arranged between an outer end wall of the vane heat shield and an outer mount panel of the vane support.

The turbine vane assembly 10 further includes an aero-load transfer rib 18 as shown in FIGS. 2 and 3. The aero-load transfer rib 18 is located outside of the primary gas path 16 and extends from the vane support 12 to the vane heat shield 14. The aero-load transfer rib 18 is configured to carry loads applied to the vane heat shield 14 to the vane support 12 while maintaining a cooling air gap 20 between the vane heat shield 14 and the vane support 12 at all radial locations along the primary gas path 16. The cooling air gap 20 between the vane heat shield 14 and the vane support 12 extends radially from the radially inner boundary of the primary gas path 16 to the radially outer boundary of the primary gas path 16.

The aero-load transfer rib 18 in the illustrative embodiment is integrally formed with the vane support 12 such that the aero-load transfer rib 18 and the vane support 12 are included in a one-piece support component as shown in FIGS. 2 and 3. In other embodiments, the vane support 12 and the aero-load transfer rib 18 may be formed separately and then fitted together to form the vane support 12. Further, the aero-load transfer rib 18 may be formed integrally with the vane heat shield 14 in a one-piece support component.

In the illustrative embodiment, the vane support 12 includes an outer mount panel 22, an inner panel 23, and a spar 24 as shown in FIG. 2. The spar 24 extends radially-inwardly from the outer mount panel 22 to the inner panel 23. The spar 24 is hollow to allow flow of cooling air through the spar 24 as shown in FIGS. 2 and 3.

The vane support 12 is formed to further include a primary cooling channel 25 and cooling air discharge apertures 26 as shown in FIG. 2. The primary cooling channel 25 extends radially through the outer mount panel 22 and into the spar 24. The cooling air discharge apertures 26 extend through the spar 24 to fluidly interconnect the primary cooling channel 25 with the cooling air gap 20.

The cooling air flowing through the primary cooling channel 25 included in the spar 24 is discharged through the cooling air discharge apertures 26 included in the spar 24. The cooling air flowing through the cooling air discharge apertures 26 flows downward away from the outer mount panel 22 through the cooling air gap 20 to cool the vane heat shield 14 shielding the vane support 12 from the hot gases passing flowing through the primary gas path 16.

The vane heat shield 14 includes an outer end wall 28, an inner end wall 30, and an airfoil 32 extending between and interconnecting the outer end wall 28 and the inner end wall 30 as shown in FIG. 2. The outer end wall 28 defines a radially outer boundary of the primary gas path 16 and the inner end wall 30 defines a radially inner boundary of the primary gas path 16. The outer end wall 28 and the inner end wall 30 shield the outer mount panel 22 and inner panel 23 of the vane support 12 from the primary gas path 16. The airfoil 32 is shaped to redirect air flowing through the gas turbine engine and shield the spar 24 of the vane support 12 from the primary gas path 16.

The vane heat shield 14 further includes a locating tab 34 as shown in FIGS. 2 and 3. The locating tab 34 extends radially outwardly from the outer end wall 28 to a location radially outward of the primary gas path 16. The locating tab 34 is contacted by the aero-load transfer rib 18. The outer end wall 28, the airfoil 32, and the locating tab 34 of the vane heat shield 14 are integrally formed from ceramic matrix composite materials such that the outer end wall 28, the airfoil 32, and the locating tab 34 are included in a one-piece shield component as shown in FIGS. 2 and 3.

The locating tab 34 may extend radially outward of a pressure side 35 of the airfoil 32 included in the vane heat shield 14 without extending radially outward of a suction side 36 of the airfoil 32 included in the vane heat shield 14. In some other embodiments, the locating tab 34 may be located outward of the suction side 36 of the airfoil 32.

In another illustrative embodiment, the vane support 12 defines a tab-receiving cavity 37 as shown in FIGS. 2-3. The tab-receiving cavity 37 extends radially outwardly into the outer mount panel 22. In some embodiments, the locating tab 34 of the vane heat shield 14 extends into the tab-receiving cavity 37. The aero-load transfer rib 18 contacts the locating tab 34 within the tab-receiving cavity 37.

During operation of the gas turbine engine, pressure loads acting on the turbine vane assembly 10 may be transfer between the airfoil 32 and the outer and inner end walls 28, 30 to the spar 24. The transferring of the pressure loads may occur through the aero-load transfer rib 18 in contact with the locating tab 34 of the vane heat shield 14.

The turbine vane assembly 10 further includes compressible seals 38 as shown in FIGS. 2 and 3. The outer end wall 28 of the vane heat shield 14 is spaced radially from the outer mount panel 22 of the vane support 12. The compressible seals 38 are arranged radially between the outer end wall 28 and the outer mount panel 22. In some embodiments, the compressible seals 38 could be wire, braid, spring, or another compliant feature. According to another aspect of the present disclosure, there may be no load-bearing component arranged in the cooling air gap 20 and the aero-load transfer rib 18 is located outside of the primary gas path 16. The aero-load transfer rib 18 is configured to carry all circumferential loads that transfer from the vane heat shield 14 to the vane support 12.

In the illustrative embodiment, the turbine vane assembly 10 is illustratively shown as a doublet vane, having two separate vane heat shields. Each vane heat shield having an airfoil 32 that extends between the outer end wall 28 and the inner end wall 30. However, it is within the scope of this disclosure for the present teachings to also apply to singlets, triplets, etc. having one or multiple vane heat shields in a single assembly.

Figure 4:
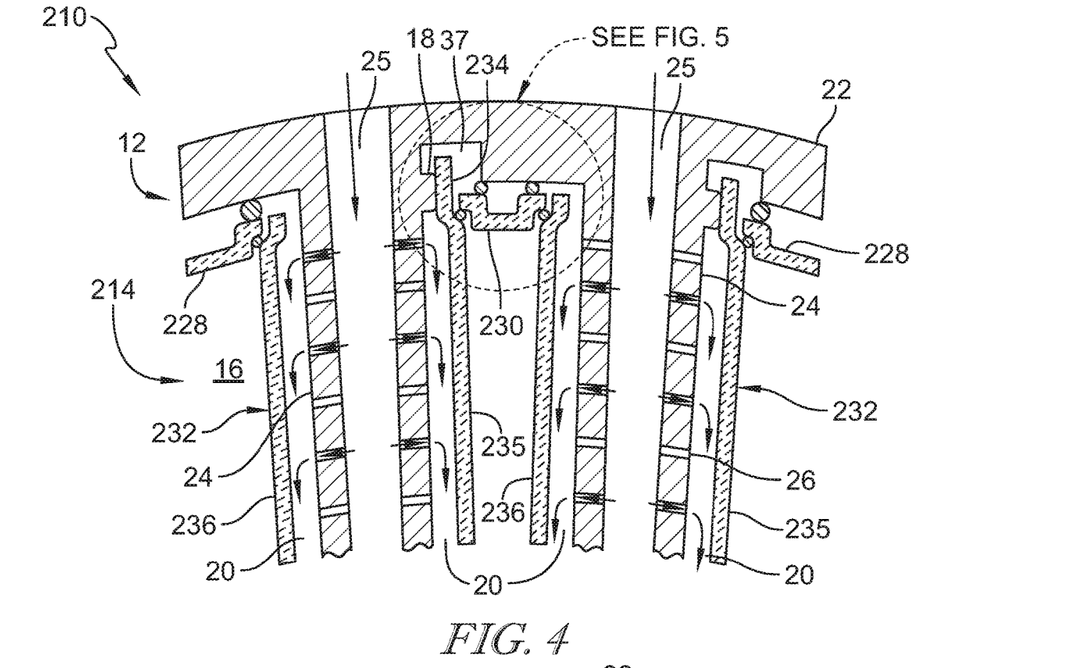
FIG. 4 is a cross sectional view of a second turbine vane assembly showing that the turbine vane assembly includes a vane support, a vane heat shield made of ceramic matrix composite materials, and an aero-load transfer rib configured to carry aerodynamic loads from the vane heat shield to the vane support while maintaining a cooling air gap between the vane heat shield and vane support across a primary gas path of the turbine assembly.
Figure 5:
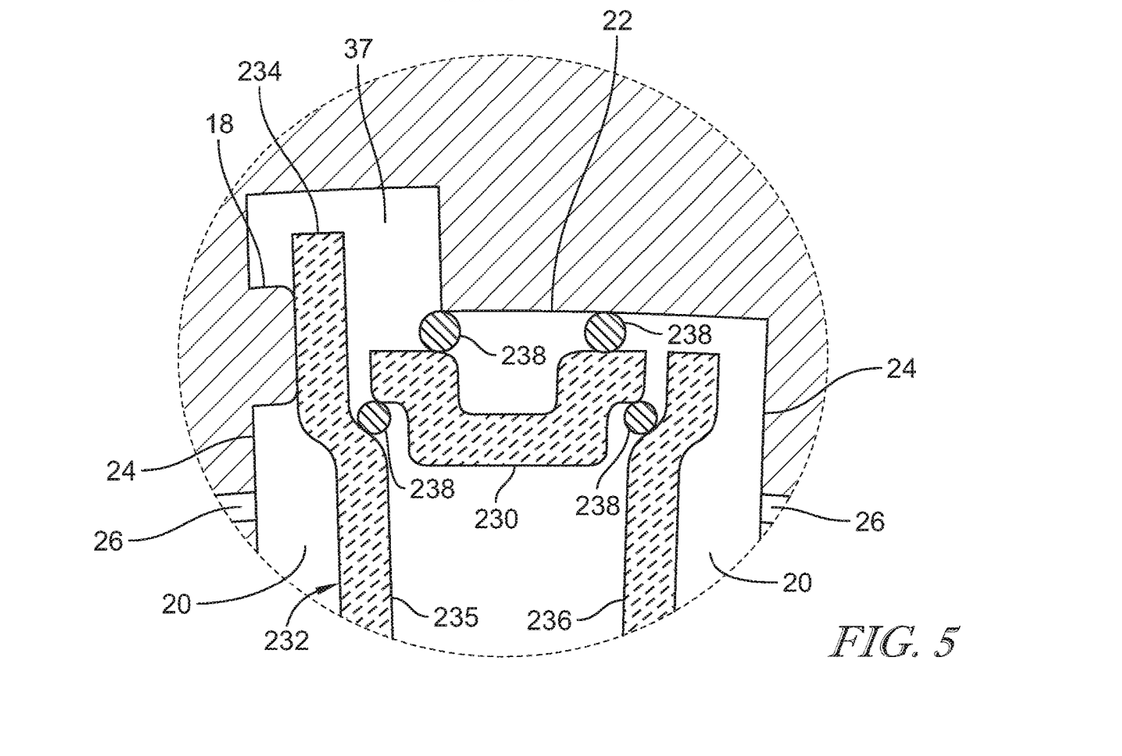
FIG. 5 is a detail view of the turbine vane assembly of FIG. 4 showing an outer end wall and an airfoil formed separately and then fitted together to form the vane heat shield and showing the aero-load transfer rib extends from the vane support to the vane heat shield.

A second turbine vane assembly 210 is shown in FIGS. 4 and 5 and is similar to the turbine vane assembly 10 shown and described in FIGS. 1-3. The turbine vane assembly 210 includes a vane support 12 and a vane heat shield 214. The vane support 12 comprises metallic material while the vane heat shield 214 comprises ceramic matrix composite materials as shown in FIG. 4. The vane heat shield 214 insulates the metallic materials of the vane support 12 from high temperatures in a primary gas path 16 defined through the turbine vane assembly 210.

The turbine vane assembly 210 further includes an aero-load transfer rib 18 as shown in FIGS. 4 and 5. The aero-load transfer rib 18 is located outside of the primary gas path 16 and extends from the vane support 12 to the vane heat shield 214. The aero-load transfer rib 18 is configured to carry loads applied to the vane heat shield 214 to the vane support 12 while maintaining a cooling air gap 20 between the vane heat shield 214 and the vane support 12 at all radial locations along the primary gas path 16. The cooling air gap 20 between the vane heat shield 214 and the vane support 12 extends radially from the radially inner boundary of the primary gas path 16 to the radially outer boundary of the primary gas path 16.

The vane heat shield 214 includes an outer end wall 228, an inner end wall 230, and an airfoil 232 extending between and interconnecting the outer end wall 228 and the inner end wall 230 as shown in FIG. 4. The outer end wall 228 defines a radially outer boundary of the primary gas path 16 and the inner end wall 230 defines a radially inner boundary of the primary gas path 16. The outer end wall 228 shields the outer mount panel 22 of the vane support 12 from the primary gas path 16. The airfoil 232 is shaped to redirect air flowing through the gas turbine engine and shield the spar 24 of the vane support 12 from the primary gas path 16.

The vane heat shield 214 further includes a locating tab 234 as shown in FIGS. 4 and 5. The locating tab 234 extends radially outwardly from the outer end wall 228 to a location radially outward of the primary gas path 16. The locating tab 234 is contacted by the aero-load transfer rib 18. The outer end wall 228 and the airfoil 232 of the vane heat shield 14 are formed separately from ceramic matrix composite materials and then fitted together to form the vane heat shield 214 that follows the contours of all gas path surfaces as shown in FIGS. 4 and 5. According to an aspect of the present disclosure, the locating tab 234 may extend radially outward of a pressure side 235 of the airfoil 232 included in the vane heat shield 214 without extending radially outward of a suction side 236 of the airfoil 232 included in the vane heat shield 14.

The vane support 12 defines a tab-receiving cavity 37 as shown in FIGS. 4 and 5. The tab-receiving cavity 37 extends radially outwardly into the outer mount panel 22. In some embodiments, the locating tab 234 of the vane heat shield 214 extends into the tab-receiving cavity 37. The aero-load transfer rib 18 contacts the locating tab 234 within the tab-receiving cavity 37.

During operation of the gas turbine engine, pressure loads acting on the turbine vane assembly 10 may be transfer between the airfoil 232 and the spar 24. The transferring of the pressure loads may occur through the aero-load transfer rib 18 in contact with the locating tab 234 of the vane heat shield 214.

The turbine vane assembly 210 further includes compressible seals 238 as shown in FIGS. 4 and 5. The outer end wall 228 of the vane heat shield 214 is spaced radially from the outer mount panel 22 of the vane support 12. The compressible seals 238 are arranged radially between the outer end wall 228 and the outer mount panel 22. The compressible seals 238 may also be arranged between the outer end wall 228 and the airfoil 232 to seal the components together.

Figure 6:
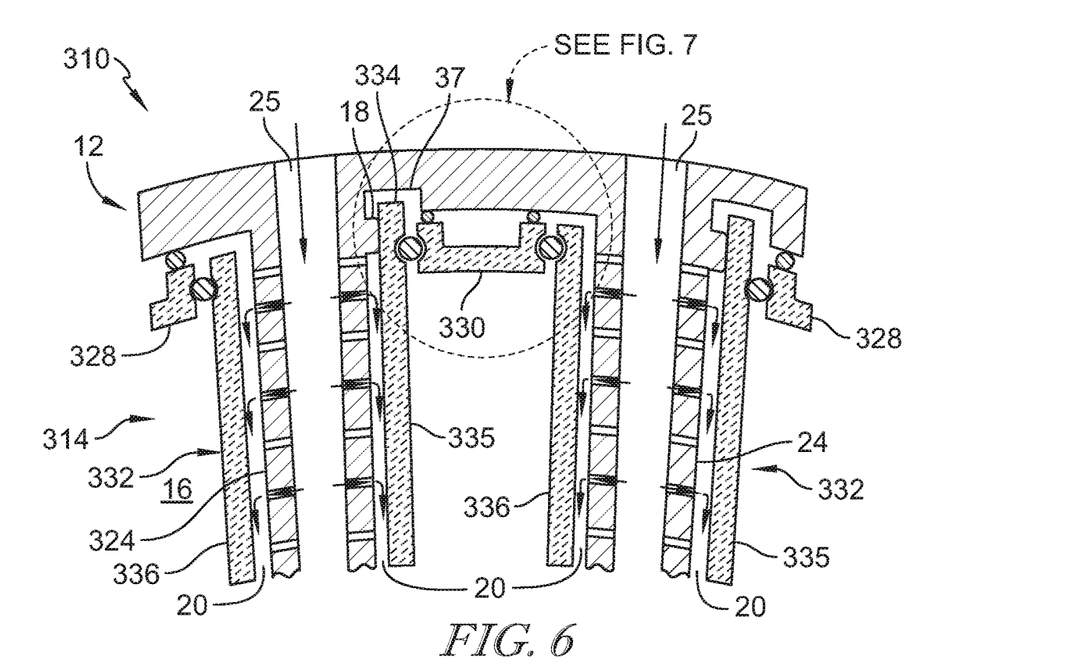
FIG. 6 is a cross sectional view of a third turbine vane assembly showing that the turbine vane assembly includes a vane support, a vane heat shield made of ceramic matrix materials, and an aero-load transfer rib configured to carry aerodynamic loads from the vane heat shield to the vane support while maintaining a cooling air gap between the vane heat shield and vane support across a primary gas path of the turbine assembly.
Figure 7:
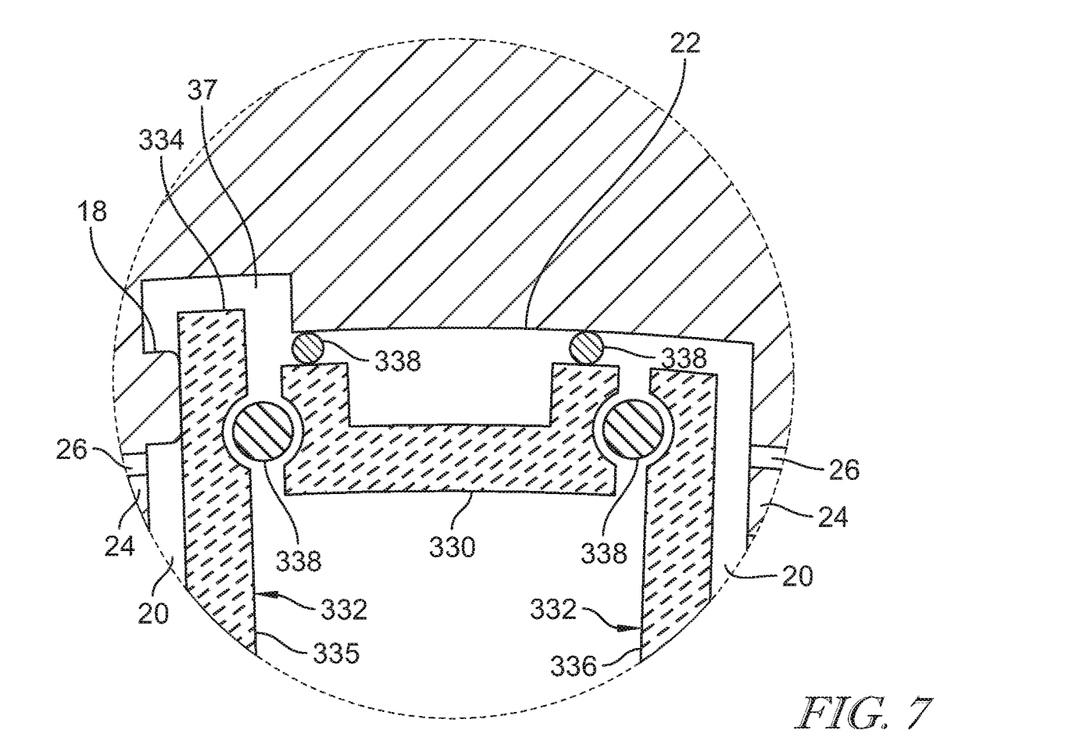
FIG. 7 is a detail view of the turbine vane assembly of FIG. 6 showing an outer end wall and an airfoil formed separately and then fitted together to form the vane heat shield and showing the aero-load transfer rib extends from the vane support to the vane heat shield.

A third turbine vane assembly 310 is shown in FIGS. 6 and 7 and is similar to the turbine vane assembly 10 shown and described in FIGS. 1-3. The turbine vane assembly 310 includes a vane support 12 and a vane heat shield 314. The vane support 12 comprises metallic material while the vane heat shield 314 comprises ceramic matrix composite materials as shown in FIG. 6. The vane heat shield 314 insulates the metallic materials of the vane support 12 from high temperatures in a primary gas path 16 defined through the turbine vane assembly 310.

The turbine vane assembly 310 further includes an aero-load transfer rib 18 as shown in FIGS. 6 and 7. The aero-load transfer rib 18 is located outside of the primary gas path 16 and extends from the vane support 12 to the vane heat shield 314. The aero-load transfer rib 18 is configured to carry loads applied to the vane heat shield 314 to the vane support 12 while maintaining a cooling air gap 20 between the vane heat shield 314 and the vane support 12 at all radial locations along the primary gas path 16. The cooling air gap 20 between the vane heat shield 314 and the vane support 12 extends radially from the radially inner boundary of the primary gas path 16 to the radially outer boundary of the primary gas path 16.

The vane heat shield 314 includes an outer end wall 328, an inner end wall 330, and an airfoil 332 extending between and interconnecting the outer end wall 328 and the inner end wall 330 as shown in FIG. 6. The outer end wall 328 defines a radially outer boundary of the primary gas path 16 and the inner end wall 330 defines a radially inner boundary of the primary gas path 16. The outer end wall 328 shields the outer mount panel 22 of the vane support 12 from the primary gas path 16. The airfoil 332 is shaped to redirect air flowing through the gas turbine engine and shield the spar 24 of the vane support 12 from the primary gas path 16.

The vane heat shield 314 further includes a locating tab 334 as shown in FIGS. 6 and 7. The locating tab 334 extends radially outwardly from the outer end wall 328 to a location radially outward of the primary gas path 16. The locating tab 334 is contacted by the aero-load transfer rib 18. The outer end wall 328 and the airfoil 332 of the vane heat shield 314 are formed separately from ceramic matrix composite materials and then fitted together to form the vane heat shield 314 that follows all contours of the gas path surfaces as shown in FIGS. 6 and 7. According to an aspect of the present disclosure, the locating tab 334 may extend radially outward of a pressure side 335 of the airfoil 332 included in the vane heat shield 314 without extending radially outward of a suction side 336 of the airfoil 332 included in the vane heat shield 314.

The vane support 12 defines a tab-receiving cavity 37 as shown in FIGS. 6 and 7. The tab-receiving cavity 37 extends radially outwardly into the outer mount panel 22. In some embodiments, the locating tab 334 of the vane heat shield 314 extends into the tab-receiving cavity 37. The aero-load transfer rib 18 contacts the locating tab 334 within the tab-receiving cavity 37.

During operation of the gas turbine engine, pressure loads acting on the turbine vane assembly 10 may be transfer between the airfoil 332 and the spar 24. The transferring of the pressure loads may occur through the aero-load transfer rib 18 in contact with the locating tab 334 of the vane heat shield 314.

The turbine vane assembly 310 further includes compressible seals 338 as shown in FIGS. 6 and 7. The outer end wall 328 of the vane heat shield 314 is spaced radially from the outer mount panel 22 of the vane support 12. The compressible seals 338 are arranged radially between the outer end wall 328 and the outer mount panel 22. The compressible seals 338 may also be arranged between the outer end wall 328 and the airfoil 232 to seal the components together. The compressible seals 338 shown in FIGS. 6 and 7 are also to be located in grooves included in opposite faces of the outer end wall 328 and the airfoil 332. The grooves are created in the opposite faces of the outer end wall 328 and the airfoil 332 by either machining or forming. The compressible seals 338 are trapped between the outer end wall 328 and the airfoil 332 when the components are assembled together and creates a seal.

The introduction of CMC materials into the turbine section can allow for the reduction of cooling air usage, an increase in turbine entry temperatures, weight savings, and overall increase in turbine efficiency. The turbine vane assemblies of the present disclosure include a ceramic matrix composite airfoil and end wall as well as a metallic support structure. Contact between the metallic support strut and the ceramic matrix composite will occur outside of the primary gas path in which temperatures are lower and managing thermal grown is easier.

In some embodiments, the ceramic matrix composite airfoil could be formed and made integral to the ceramic matrix composite end wall. The ceramic matrix composite airfoil or the ceramic matrix composite end wall may protrude radially outward to create a locating tab that would nest into a mating feature of the metallic support strut. The locating tab may allow for the ceramic matrix composite components to be located to the metallic components in any direction. The locating tab would not be a radial retention feature, but may allow for locating the components radially until a different radial support could be installed on the inner side of the airfoil.

The ability to create segregation between the outer mount panel and the outer end wall will allow cavities within the turbine vane assembly to operate at different pressures and thereby reduce parasitic cooling air losses. One restriction of flow to reduce parasitic cooling losses is the compressible seals 38, 238, 338. The compressible seals may be a wire seal, braid seal, spring, or other compliant feature used to seal the cavity. Another restriction of flow could be created by shaping edges of the outer end wall 28 to create a torturous path as shown in FIG. 1. The outer end wall 28 in FIG. 1 shows a lap joint style restriction. In other embodiments, other types of restrictions could be implemented to create the torturous path.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane assembly that extends partway about a central axis, the assembly comprising
    a vane support made of metallic materials, the vane support including an outer mount panel and a spar that extends radially-inwardly from the outer mount panel,
    a vane heat shield made of ceramic matrix composite materials that defines a primary gas path adapted to conduct hot gasses during use of the turbine vane assembly in a gas turbine engine, the vane heat shield including an outer end wall that shields the outer mount panel of the vane support from the primary gas path and an airfoil that shields the spar of the vane support from the primary gas path, and
    an aero-load transfer rib located outside of the primary gas path and extending from the vane support to the vane heat shield, the aero-load transfer rib configured to carry loads applied to the vane heat shield to the vane support while maintaining a cooling air gap between the vane heat shield and the vane support at all radial locations along the primary gas path, wherein the aero-load transfer rib is integrally formed with the vane support such that the aero-load transfer rib and the vane support are included in a one-piece support component.

2. The assembly of claim 1, wherein the vane heat shield includes a locating tab that extends radially outwardly from the outer end wall to a location radially outward of the primary gas path and the locating tab is contacted by the aero-load transfer rib.

3. The assembly of claim 2, wherein the locating tab extends radially outward of a pressure side of the airfoil included in the vane heat shield without extending radially outward of a suction side of the airfoil included in the vane heat shield.

4. The assembly of claim 2, wherein the vane support defines a tab-receiving cavity that extends radially outwardly into the outer mount panel, the locating tab of the vane heat shield extends into the tab-receiving cavity, and the aero-load transfer rib contacts the locating tab within the tab-receiving cavity.

5. A turbine vane assembly that extends partway about a central axis, the assembly comprising
    a vane support made of metallic materials, the vane support including an outer mount panel and a spar that extends radially-inwardly from the outer mount panel,
    a vane heat shield made of ceramic matrix composite materials that defines a primary gas path adapted to conduct hot gasses during use of the turbine vane assembly in a gas turbine engine, the vane heat shield including an outer end wall that shields the outer mount panel of the vane support from the primary gas path and an airfoil that shields the spar of the vane support from the primary gas path, and
    an aero-load transfer rib located outside of the primary gas path and extending from the vane support to the vane heat shield, the aero-load transfer rib configured to carry loads applied to the vane heat shield to the vane support while maintaining a cooling air gap between the vane heat shield and the vane support at all radial locations along the primary gas path, wherein the vane heat shield includes a locating tab that extends radially outwardly from the outer end wall to a location radially outward of the primary gas path and the locating tab is contacted by the aero-load transfer rib.

6. The assembly of claim 5, wherein the aero-load transfer rib is integrally formed with the vane support such that the aero-load transfer rib and the vane support are included in a one-piece support component.

7. The assembly of claim 5, wherein the outer end wall, the airfoil, and the locating tab of the vane heat shield are integrally formed from ceramic matrix composite materials such that the outer end wall, the airfoil, and the locating tab are included in a one-piece shield component.

8. The assembly of claim 7, wherein the locating tab extends radially outward of a pressure side of the airfoil included in the vane heat shield without extending radially outward of a suction side of the airfoil included in the vane heat shield.

9. A turbine vane assembly that extends partway about a central axis, the assembly comprising
    a vane support made of metallic materials, the vane support including an outer mount panel and a spar that extends radially-inwardly from the outer mount panel,
    a vane heat shield made of ceramic matrix composite materials that defines a primary gas path adapted to conduct hot gasses during use of the turbine vane assembly in a gas turbine engine, the vane heat shield including an outer end wall that shields the outer mount panel of the vane support from the primary gas path and an airfoil that shields the spar of the vane support from the primary gas path, and
    an aero-load transfer rib located outside of the primary gas path and extending from the vane support to the vane heat shield, the aero-load transfer rib configured to carry loads applied to the vane heat shield to the vane support while maintaining a cooling air gap between the vane heat shield and the vane support at all radial locations along the primary gas path, wherein the vane support is formed to include a primary cooling channel and cooling air discharge apertures, the primary cooling channel extends radially through the outer mount panel and into the spar, and the cooling air discharge apertures extend through the spar to fluidly interconnect the primary cooling channel with the cooling air gap.

10. The assembly of claim 9, wherein the outer end wall of the vane heat shield is spaced radially from the outer mount panel of the vane support and the assembly further comprises a compressible seal arranged radially between the outer end wall and the outer mount panel.

11. A turbine vane assembly that extends partway about a central axis, the assembly comprising
a vane support made of metallic materials, the vane support including an outer mount panel and a spar that extends radially-inwardly from the outer mount panel,
a vane heat shield made of ceramic matrix composite materials that defines a primary gas path adapted to conduct hot gasses during use of the turbine vane assembly in a gas turbine engine, the vane heat shield including an outer end wall that shields the outer mount panel of the vane support from the primary gas path and an airfoil that shields the spar of the vane support from the primary gas path, and
an aero-load transfer rib located outside of the primary gas path and extending from the vane support to the vane heat shield, the aero-load transfer rib configured to carry loads applied to the vane heat shield to the vane support while maintaining a cooling air gap between the vane heat shield and the vane support at all radial locations along the primary gas path, wherein there is no load-bearing component arranged in the cooling air gap and the aero-load transfer rib located radially outside of the primary gas path is configured to carry all circumferential loads that transfer from the vane heat shield to the vane support.

12. A turbine vane assembly that extends partway about a central axis, the assembly comprising
a vane support made of metallic materials, the vane support including a spar that extends radially relative to the central axis,
a vane heat shield made of ceramic matrix composite materials, the vane heat shield including an airfoil that forms a sleeve around the spar to shield the spar from hot gasses in a primary gas path defined by the turbine vane assembly, and
an aero-load transfer rib located outside of the primary gas path and extending from the vane support to the vane heat shield, the aero-load transfer rib configured to carry circumferentially-directed loads applied to the airfoil of the vane heat shield to the vane support while maintaining a cooling air gap between the airfoil of the vane heat shield and the vane support at all radial locations along the primary gas path defined by the turbine vane assembly, wherein the aero-load transfer rib is integrally formed with the vane support such that the aero-load transfer rib and the vane support are included in a one-piece support component, and wherein the vane support defines a tab-receiving cavity that extends radially outwardly into the outer mount panel, a locating tab of the vane heat shield extends into the tab-receiving cavity, and the aero-load transfer rib contacts the locating tab within the tab-receiving cavity.

13. A turbine vane assembly that extends partway about a central axis, the assembly comprising
a vane support made of metallic materials, the vane support including a spar that extends radially relative to the central axis,
a vane heat shield made of ceramic matrix composite materials, the vane heat shield including an airfoil that forms a sleeve around the spar to shield the spar from hot gasses in a primary gas path defined by the turbine vane assembly, and
an aero-load transfer rib located outside of the primary gas path and extending from the vane support to the vane heat shield, the aero-load transfer rib configured to carry circumferentially-directed loads applied to the airfoil of the vane heat shield to the vane support while maintaining a cooling air gap between the airfoil of the vane heat shield and the vane support at all radial locations along the primary gas path defined by the turbine vane assembly, wherein the vane heat shield includes a locating tab that is integrally formed with the airfoil of the vane heat shield, and the locating tab extends radially outward of the airfoil to a location outside the primary gas path where the locating tab is contacted by the aero-load transfer rib.

14. The assembly of claim 13, wherein the locating tab extends radially outward of a pressure side of the airfoil without extending radially outward of a suction side of the airfoil.

15. The assembly of claim 13, wherein the airfoil, the locating tab, the outer end wall, and the inner end wall are integrally formed from ceramic matrix composite materials included in a one-piece shield component.

* * * * *